United States Patent [19]

Kishishita et al.

[11] Patent Number: 5,461,535

[45] Date of Patent: Oct. 24, 1995

[54] VARIABLE CAPACITOR

[75] Inventors: Hiroyuki Kishishita; Hidetoshi Kita, both of Kyoto, Japan

[73] Assignee: Murata Mfg. Co., Ltd., Japan

[21] Appl. No.: 343,644

[22] Filed: Nov. 22, 1994

[30] Foreign Application Priority Data

Nov. 26, 1993 [JP] Japan .................................. 5-296650
Feb. 7, 1994 [JP] Japan .................................. 6-013578

[51] Int. Cl.⁶ .................................................. H01G 5/06
[52] U.S. Cl. .................................. 361/298.1; 361/293
[58] Field of Search ........................... 361/277, 278, 361/287, 292, 293, 298.1, 298.2, 298.4; 29/25.42

[56] References Cited

U.S. PATENT DOCUMENTS 4,112,480 9/1978 Johanson ................................. 361/271

FOREIGN PATENT DOCUMENTS 5-299294 11/1993 Japan .

Primary Examiner—Kristine L. Kincaid
Assistant Examiner—Michael D. Switzer
Attorney, Agent, or Firm—Ostrolenk, Faber, Gerb & Soffen

[57] ABSTRACT

In a rotor which is rotated for adjusting capacitance provided by a variable capacitor, a portion for receiving a tool for rotating the same is defined by a through-hole. Thus, it is possible to protect the rotor from application of a pressing force from the tool, thereby suppressing change of a clearance between the rotor and a stator. Consequently, it is possible to stabilize the capacitance as the capacitor is being adjusted, as well as to reduce setting drift that causes the capacitance as adjusted disadvantageously to change when the tool is separated from the rotor.

7 Claims, 3 Drawing Sheets

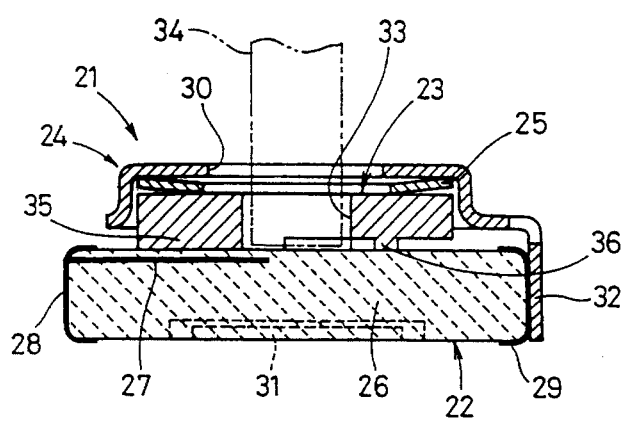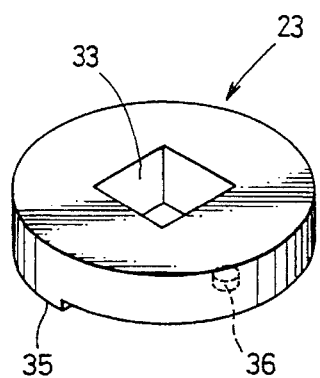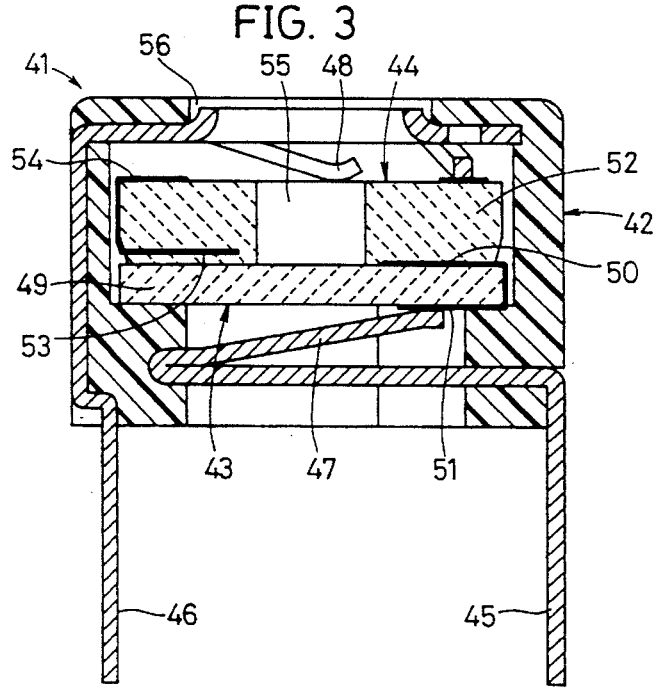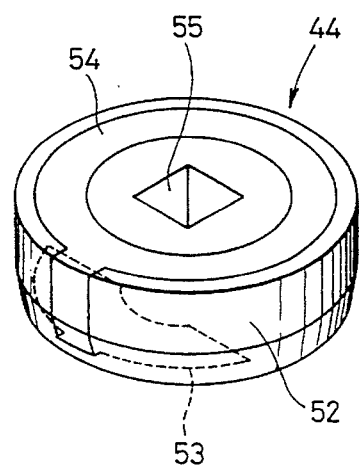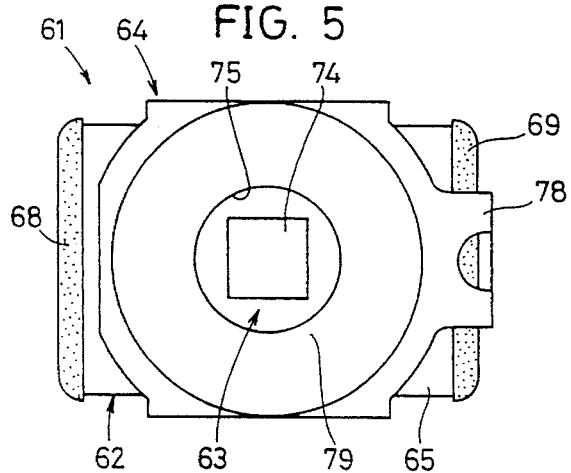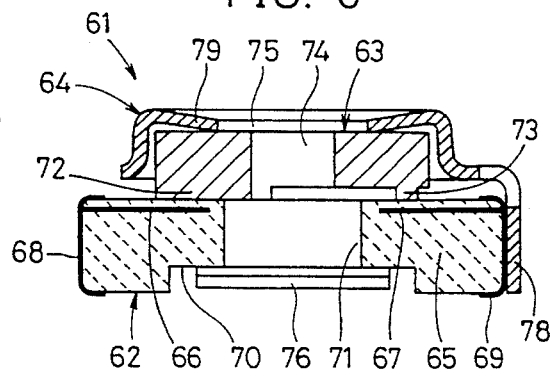

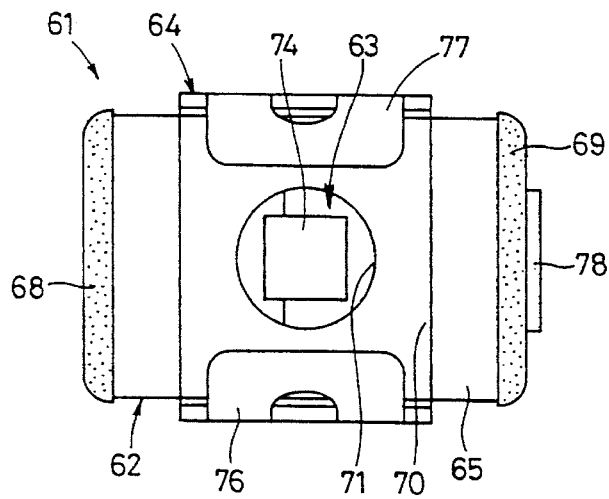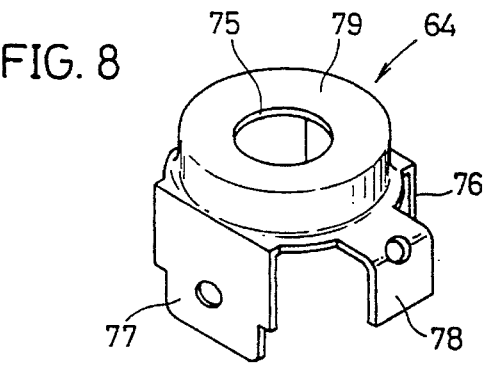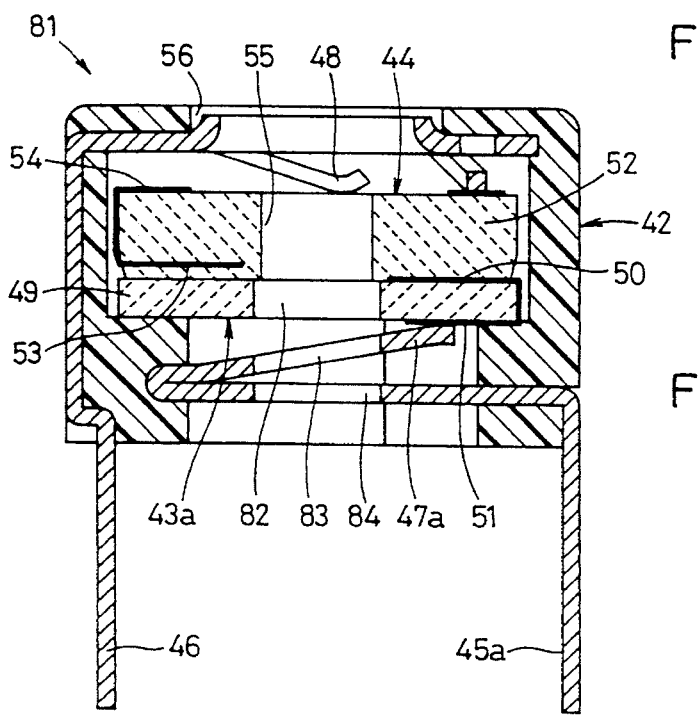

VARIABLE CAPACITOR

BACKGROUND OF THE INVENTION

1. Field of the Invention:

The present invention relates to a variable capacitor, and more particularly, it relates to a variable capacitor which changes effective areas of electrodes on the basis of rotation of a rotor.

2. Description of the Background Art:

FIGS. 14 and 15 show a conventional variable capacitor 1 which is of interest to the present invention. Japanese Patent Laying-Open No. 5-299294 (1993), for example, discloses a variable capacitor which is substantially similar to this variable capacitor 1. The variable capacitor 1 shown in FIGS. 14 and 15 is of a surface-mountable type.

The variable capacitor 1 comprises a stator 2, a rotor 3 and a cover 4. The stator 2 comprises a ceramic dielectric member 5. The rotor 3 is made of a metal such as brass, and the cover 4 is made of a metal such as stainless steel or a copper alloy.

The stator 2 is provided with a stator electrode 6 in the interior of the dielectric member 5. External electrodes 7 and 8 are formed on both end portions of the dielectric member 5 respectively, so that the external electrode 7 is electrically connected with the stator electrode 6.

The rotor 3, which is arranged on an upper surface of the aforementioned stator 2, is provided on its lower surface with a substantially semicircular rotor electrode 9 which is defined by a projecting step portion, as clearly shown in FIGS. 16 and 17. The rotor 3 is further provided on its lower surface with a protrusion 10 which is flush with the rotor electrode 9, so that rotor 3 is prevented from inclination caused by formation of the rotor electrode 9. A driver groove 11 is formed in an upper surface of the rotor 3, for receiving a tool such as a screw driver for rotating the rotor 3. As shown in FIG. 14, the driver groove 11 has a "+" shape, for example, and is provided with a bottom.

The cover 4 is so shaped as to rotatably hold the rotor 3. An adjusting hole 12 is formed in an upper wall of the cover 4, to expose the driver groove 11. This cover 4 is provided with a pair of engaging segments 13 and 14 downwardly extending from opposite positions. The cover 4 is further provided with a downwardly extending rotor terminal 15.

The aforementioned cover 4 is arranged to cover the rotor 3, after a spring washer 16 is arranged on the upper surface of the rotor 3. The spring washer 16, which is made of a metal, is in the form of an annulus ring. End portions of the respective engaging segments 13 and 14, which are provided on the cover 4 are so bent as to approach each other, whereby these engaging segments 13 and 14 engage with the lower surface of the stator 2. The rotor terminal 15 comes into contact with the external electrode 8.

In this variable capacitor 1, the stator electrode 6 is electrically connected with the external electrode 7, while the rotor 3 provided with the rotor electrode 9 is electrically connected with the cover 4 through the spring washer 16 and the rotor terminal 15 provided on the cover 4 is electrically connected with the external electrode 8. Thus, capacitance which is provided by the variable capacitor 1 is derived by the external electrode 7 and the external electrode 8 or the rotor terminal 15. In order to adjust this capacitance, a screwdriver is inserted in the driver groove 11 and rotated in this state, thereby rotating the rotor 3. Effective opposing areas of the stator electrode 6 and the rotor electrode 9 are varied by such rotation of the rotor 3, thereby changing the capacitance which is formed across the stator electrode 6 and the rotor electrode 9.

During the aforementioned adjustment of the capacitance, the screwdriver is pressed against the rotor 3, not to be separated from the driver groove 11. Tests show that this pressing force is generally 100 to 300 gf. Such pressing force acts to press the rotor 3 against the stator 2, and temporarily narrows an extremely small clearance which can be defined between the rotor 3 and the stator 2. When the screwdriver is separated from the driver groove 11 after the adjustment, on the other hand, the aforementioned pressing force is removed and the clearance between the rotor 3 and the stator 2 is widened as compared with that during the adjustment.

It is well known that the capacitance is increased when the distance between the stator electrode 6 and the rotor electrode 9 is reduced, and vice versa. The aforementioned change of the clearance between the stator 2 and the rotor 3 changes the distance between the stator electrode 6 and the rotor electrode 9, thereby changing the capacitance. Therefore, the capacitance which may be obtained at a desired value by inserting the screwdriver in the driver groove 11 and rotating the rotor 3 is disadvantageously displaced from the desired value when the screwdriver is separated from the driver groove 11 (setting drift). When a pressing force of 300 gf which is is removed, for example, the capacitance is reduced by about 2%. Thus, it is difficult to adjust the capacitance of the variable capacitor 1.

When the screwdriver is manually operated, further, it is difficult to maintain the force which is applied from the screwdriver to the rotor 3 at a constant level. Thus, the capacitance is unstable during rotation of the rotor 3.

SUMMARY OF THE INVENTION

Accordingly, an object of the present invention is to provide a variable capacitor which can solve the aforementioned problems.

The present invention is directed to a variable capacitor comprising a stator having a stator electrode, a rotor having a rotor electrode which is opposed to the stator electrode, a dielectric material which is interposed between the stator electrode and the rotor electrode, and means for rotatably holding the rotor with respect to the stator. According to the present invention, the rotor is improved in structure, for solving the aforementioned problems. Namely, a portion for receiving a tool is defined by a through-hole in the rotor so that the tool engaging with the rotor is rotated thereby rotating the rotor.

Thus, the tool is inserted in the through hole according to the present invention, whereby pressing force from the tool may be applied to the stator, but not to the rotor. Thus, a clearance defined between the rotor and the stator is hardly influenced by the pressing force which is applied from the tool. Consequently, it is possible to inhibit displacement of capacitance (setting drift) after adjustment, and instability of the capacitance during the adjustment. Therefore, it is not necessary to strictly control the pressing force which is applied from the tool, whereby the present invention is suitable not only for manual adjustment of the capacitance but for automatic adjustment by a machine.

The present invention is applicable to various types of variable capacitors. In a certain type of a variable capacitor to which the present invention is applied, the stator comprises a dielectric member which is provided with the stator electrode in its interior, and the dielectric material interposed between the stator electrode and the rotor electrode is defined by a part of this dielectric member. In this case, the rotor is preferably made of a metal, and the rotor electrode is defined by a projecting portion which is formed on one surface of this rotor.

In another type of a variable capacitor, the stator comprises an electric insulator member which is provided with the stator electrode on its surface. In this case, the rotor preferably comprises a dielectric member which is provided with the rotor electrode in its interior, and the dielectric material interposed between the stator electrode and the rotor electrode is defined by a part of this dielectric member.

The means for rotatably holding the rotor preferably comprises a cover which engages the stator while rotatably holding the rotor. This cover is provided with an opening for allowing insertion of the tool in the through-hole of the rotor.

A spring washer may be arranged between the rotor and the cover. This spring washer urges the rotor to elastically press the same against the stator.

According to the present invention, the rotor is provided with a through-hole serving as a portion for receiving the tool for rotating the same, as hereinabove described. This enables implementation of a variable capacitor which can be adjusted from either side, as described below. In order to implement such a variable capacitor which is adjustable from either side, the stator is provided with a second through-hole which is aligned with a first through-hole provided in the rotor to define a series of through-paths opening toward the exterior. This second through-hole has dimensions allowing passage and rotation of the tool which is received in the first through hole. Due to the second through-hole which is provided in the stator, the tool for rotating the rotor can be inserted from either end of the first through-hole, whereby it is possible to adjust the variable capacitor from either side.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a longitudinal sectional view showing a variable capacitor according to a first embodiment of the present invention;

FIG. 2 is a perspective view independently showing a rotor provided in the variable capacitor shown in FIG. 1;

FIG. 3 is a longitudinal sectional view showing a variable capacitor according to a second embodiment of the present invention;

FIG. 4 is a perspective view independently showing a rotor provided in the variable capacitor shown in FIG. 3;

FIG. 5 is a plan view showing a variable capacitor according to a third embodiment of the present invention;

FIG. 6 is a longitudinal sectional view of the variable capacitor shown in FIG. 5;

FIG. 7 is a bottom plan view of the variable capacitor shown in FIG. 5;

FIG. 8 is a perspective view independently showing a cover provided in the variable capacitor shown in FIG. 5;

FIG. 9 is a perspective view independently showing a rotor provided in the variable capacitor shown in FIG. 5;

FIG. 10 is a perspective view showing a lower surface of the rotor shown in FIG. 9;

FIG. 11 is a perspective view showing a stator provided in the variable capacitor shown in FIG. 5;

FIG. 12 is a perspective view showing a lower surface of the stator shown in FIG. 11;

FIG. 13 is a longitudinal sectional view showing a variable capacitor according to a fourth embodiment of the present invention;

DESCRIPTION OF THE PREFERRED EMBODIMENTS

Figure 14:
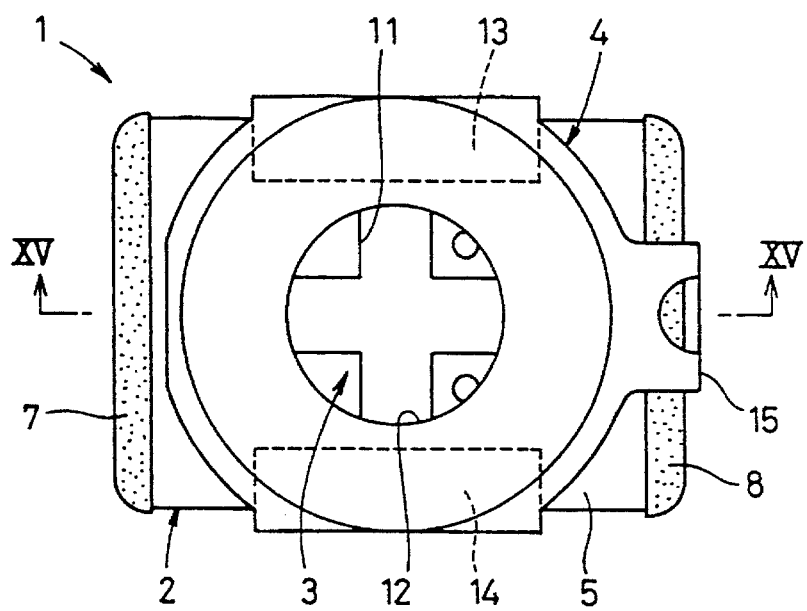
FIG. 14 is a plan view showing a conventional variable capacitor which is of interest to the present invention.

Referring to FIG. 1, a variable capacitor 21 comprises a stator 22, a rotor 23, a cover 24 and a spring washer 25. Comparing FIGS. 1 and 15 with each other, it is understood that the stator 22, the cover 24 and the spring washer 25 provided in the variable capacitor 21 are substantially identical in structure to the stator 2, the cover 4 and the spring washer 16 provided in the variable capacitor 1, respectively. Therefore, the above description in relation to the stator 2, the cover 4 and the spring washer 16 of the variable capacitor 1 is also applicable to the stator 22, the cover 24 and the spring washer 25, and redundant description is omitted. Briefly stated, the stator 22 comprises a ceramic dielectric member 26, which is provided with a stator electrode 27 in its interior. External electrodes 28 and 29 are formed on both end portions of the dielectric member 26, so that the external electrode 28 is electrically connected to the stator electrode 27. The cover 24 has an adjusting hole 30, and comprises a pair of engaging segments (FIG. 1 shows only one engaging segment 31 by broken lines) and a rotor terminal 32.

The variable capacitors 21 and 1 are substantially different from each other merely in structures of the rotors 23 and 3. FIG. 2 independently shows the rotor 23.

Rotor 23 is made of a metal such as brass, and is provided in its center with a through-hole 33 having a square section. This through-hole 33 is adapted to receive a tool such as a screwdriver 34 (shown by phantom lines in FIG. 1) for rotating the rotor 23, in place of the driver groove 11 provided in the aforementioned variable capacitor 1. Similarly to the rotor 3, the rotor 23 is provided on its lower surface with a substantially semicircular rotor electrode 35 which is defined by a projecting step portion, and a protrusion 36 which is flush with the rotor electrode 35.

When the screwdriver 34 is inserted in the through-hole 33 of the rotor 23 in such a variable capacitor 21 as shown in FIG. 1, a forward end portion of the screwdriver 34 passes through the through-hole 33, to come into contact with an upper surface of the stator 22. While the rotor 23 is rotated, therefore, downwardly directed force which is applied from the screw driver 34 exerts substantially no action on the rotor 23.

Consequently, a clearance between the stator 22 and the rotor 23 is hardly changed by the pressing force from the screw driver 34, and hence it is possible to inhibit the capacitance from being unstable during adjustment, as well as from displacement (setting drift) after the adjustment.

While the variable capacitor 21 shown in FIG. 1 is provided with the spring washer 25, a peripheral edge portion of the adjusting hole 30 provided in the cover 24 may be brought into the form of a dish or the like to have an elastic function, thereby omitting the spring washer 25.

The rotor electrode 35 is not restricted to the semicircular plane shape, i.e., a sectorial shape having a central angle of 180°, but may be changed to another shape such as a sectorial shape having a central angle other than 180°, for example. Further, the protrusion 36 is not restricted to the columnar shape shown in FIG. 2, but may have another shape. For example, this protrusion 36 may be replaced by an arcuate protrusion extending along a lower outer peripheral surface of the rotor 23 independently of the rotor electrode 35. In addition, the positional relation between the through-hole 33, the rotor electrode 35 and the protrusion 36 is not restricted to the illustrated one. Further, the through-hole 33 is not restricted to the square sectional shape shown in FIG. 2, but may have any shape so far as the rotor 23 is rotated following rotation of a tool such as the screwdriver 34. In relation to this, it can be inferred that the through-hole 33 may have any sectional shape other than a circular one.

Referring to FIG. 3, a variable capacitor 41 according to a second embodiment of the present invention comprises a case 42 consisting of electric insulating resin. This case fixedly and rotatably holds a stator 43 and a rotor 44, respectively. The case 42 holds a stator terminal 45 and a rotor terminal 46, each of which is made of a metal having spring quality. The stator terminal 45 is integrally formed with a spring portion 47 which is elastically in contact with a lower surface of the stator 43. On the other hand, the rotor terminal 46 is integrally formed with a plurality of spring portions 48 which are elastically in contact with an upper surface of the rotor 44 for pressing the same against the stator 43.

The stator 43 comprises an electric insulator member 49 which is made of alumina, for example. A substantially semicircular stator electrode 50 is formed on an upper surface of the insulator member 49. A lead electrode 51 is formed to extend from a side surface toward a lower surface of the insulator member 49, to be electrically connected to the stator electrode 50. The spring portion 47 of the stator terminal 45 is in contact with the lead electrode 51.

FIG. 4 independently shows the rotor 44, which comprises a ceramic dielectric member 52. A substantially semicircular rotor electrode 53 is formed in the interior of this dielectric member 52. A lead electrode 54 is formed to extend from a side surface toward an upper surface of the dielectric member 52. This lead electrode 54 is electrically connected with the rotor electrode 53 on the side surface of the dielectric member 52. The lead electrode 54 has a portion extending in the form of a ring on the upper surface of the dielectric member 52, which is substantially in the form of a disc. While the rotor 44 is rotated, therefore, the spring portions 48 of the rotor terminal 46 can be continuously in contact with the portion of the lead electrode 54 extending in the form of a ring.

A through-hole 55 having a square section is provided in a central portion of the rotor 44. This through-hole 55 is adapted to receive a tool (not shown) such as a screwdriver for rotating the rotor 44. This tool is inserted in the through-hole 55 through an opening 56 which is provided in the case 42.

Thus, the stator electrode 50 is electrically connected to the stator terminal 45 through the lead electrode 51 and the spring portion 47 in the variable capacitor 41. On the other hand, the rotor electrode 53 is electrically connected to the rotor terminal 46 through the lead electrode 54 and the spring portions 48. Therefore, capacitance which is formed across the stator electrode 50 and the rotor electrode 53 is derived by the stator terminal 45 and the rotor terminal 46. This capacitance is adjusted by inserting the tool in the through-hole 55 and rotating the rotor 44. In relation to such adjustment of the capacitance, the variable capacitor 41 can attain advantages, which are substantially similar to those of the aforementioned variable capacitor 21.

Figure 15:
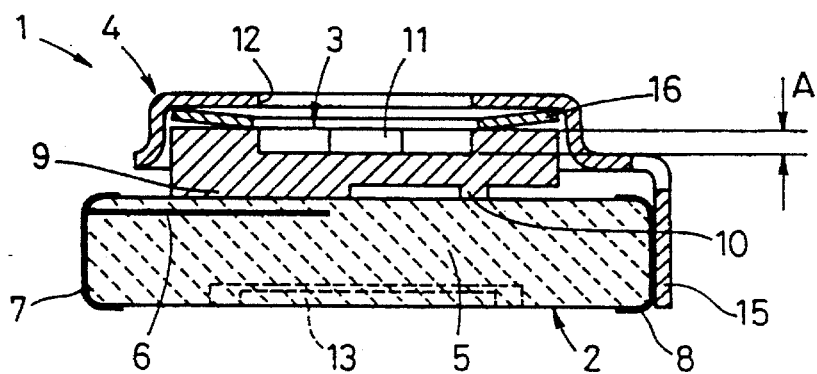
FIG. 15 is a sectional view taken along the line XV—XV in FIG. 14.
Figure 16:
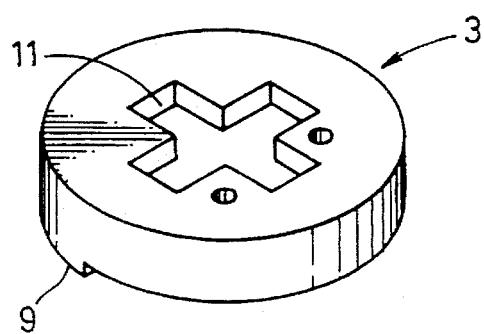
FIG. 16 is a perspective view independently showing a rotor provided in the variable capacitor shown in FIG. 14.
Figure 17:
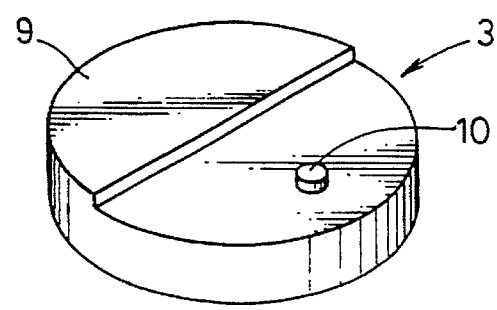
FIG. 17 is a perspective view showing a lower surface of the rotor shown in FIG. 16.

Various thicknesses preferably are required for the rotors 3, 23 and 41 of the variable capacitors 1, 21 and 41 shown in FIGS. 15, 1 and 3 respectively. In the rotor 3 shown in FIG. 15, the depth A of the driver groove 11 is so selected as to ensure engagement with the tool such as a screw driver. In the rotors 23 and 44 shown in FIGS. 1 and 3, therefore, it is possible to insert the tools reliably in the through-holes 33 and 55 by selecting axial sizes of the through-holes 33 and 55 to be identical at least to the depth A of the driver groove 11. The axial sizes of the through-holes 33 and 55 are substantially equal to the thicknesses of the rotors 23 and 44, whereby these thicknesses can be reduced as compared with that of the rotor 3, although the same are not illustrated as such. Thus, it is also possible to reduce the overall thicknesses of the variable capacitors 21 and 41, thereby advantageously coping with miniature electronic devices in which reduction in height is desired. Such an advantage also applies to the following embodiments.

With reference to FIGS. 5 to 12, a variable capacitor 61 according to a third embodiment of the present invention is now described. This variable capacitor 61 can be adjusted from either side. The variable capacitor 61 is similar in structure to the variable capacitor 21 shown in FIG. 1.

The variable capacitor 61 comprises a stator 62, a rotor 63 and a cover 64. The stator 62 comprises a ceramic dielectric member 65. The rotor 63 is made of a metal such as brass, while the cover 64 is made of a metal such as stainless steel or a copper alloy.

The stator 62 is provided with first and second stator electrodes 66 and 67 in the interior of the dielectric member 65. First and second external electrodes 68 and 69 are formed on both end portions of the dielectric member 65, to be electrically connected with the first and second stator electrodes 66 and 67 respectively. Further, a concave portion 70 is provided in a lower surface of the stator 62, between the end portions provided with the external electrodes 68 and 69 respectively. In addition, the stator 62 is provided in its central portion with a circular through-hole 71, for example. Thus, the stator 62 has a symmetrical structure. In a step of assembling the variable capacitor 61, therefore, it is not necessary to incorporate the stator 62 in consideration of its direction.

The rotor 63, which is substantially similar in structure to the rotor 23 shown in FIG. 2, is provided on its lower surface with a substantially semicircular rotor electrode 72 which is defined by a projecting step portion, and a protrusion 73 which is flush with the rotor electrode 72. Further, the rotor 63 is provided in its central portion with a through-hole 74 having a square section, for example.

Similarly to the cover 24 shown in FIG. 1, the cover 64 is provided on its upper surface with an adjusting hole 75, and comprises a pair of downwardly-extending engaging segments 76 and 77, and a rotor terminal 78. Comparing FIGS. 1 and 6 with each other, it is understood that the variable capacitor 61 comprises no separate component corresponding to the spring washer 25 shown in FIG. 1. In substitution, a peripheral edge portion of the adjusting hole 75 is downwardly inclined toward its center, thereby defining a spring action part 79.

With the stator 62, the rotor 63 and the cover 64, the variable capacitor 61 is assembled as follows: First, the rotor 63 is placed on the stator 62, and the cover 64 is arranged to cover the rotor 63. Then, the cover 64 is pressed against the stator 62 to bring the rotor 63 into pressure contact with the stator 62, while respective end portions of the engaging segments 76 and 77 provided in the cover 64 are inwardly bent respectively. Thus, the engaging segments 76 and 77 engage with the concave portion 70 which is provided in the lower surface of the stator 62 respectively.

Thus, the variable capacitor 61 is completely assembled. In this assembled state, the through-hole 71 provided in the stator 62 is aligned with the through-hole 74 provided in the rotor 63, to define a series of through-paths opening toward the exterior. The through-hole 71 of the stator 62 has dimensions allowing passage and rotation of a tool such as a screw driver which is received in the through hole 74 of the rotor 63. According to this variable capacitor 61, therefore, it is possible to insert the tool such as a screwdriver in the through-hole 74 of the rotor 63 from above through the adjusting hole 75 of the cover 64, while it is also possible to insert the tool in the through-hole 74 of the rotor 63 from below through the through-hole 71 of the stator 62. Thus, the same tool can be vertically inserted in the through-hole 74 of the rotor 63 from either side of the variable capacitor 61, for rotating the rotor 63.

Due to the aforementioned rotation of the rotor 63, it is possible to adjust capacitance provided by the variable capacitor 61. This capacitance is formed across the first stator electrode 66 and the rotor electrode 72. The second stator electrode 67, which is adapted to eliminate directivional dependence in incorporation of the stator 62 as described above, serves as a dummy electrode after the variable capacitor 61 is assembled. The first stator electrode 66 is electrically connected to the first external electrode 68, while the rotor electrode 72 is electrically connected to the rotor terminal 78 provided on the cover 64 which is in contact with the rotor 63, as well as to the second external electrode 69 which is in contact with the rotor terminal 78. Therefore, the capacitance is derived by the first external electrode 68 and the rotor terminal 78 or the second external electrode 69.

Referring to FIG. 13, a variable capacitor 81 according to a fourth embodiment of the present invention is now described. The variable capacitor 81 has a structure which is extremely similar to that of the variable capacitor 41 shown in FIG. 3, and comprises elements which are common to those of the variable capacitor 41. Therefore, elements shown in FIG. 13 corresponding to those shown in FIG. 3 are denoted by similar reference numerals, to omit redundant description.

In the variable capacitor 81 shown in FIG. 13, a through-hole 82 is provided in a central portion of a stator 43a. This through hole 82 is aligned with a through-hole 55 which is provided in a rotor 44, to define a series of through-paths opening toward the exterior. The through-hole 82 has dimensions allowing passage and rotation of a tool which is received in the through-hole 55 provided in the rotor 44.

In the variable capacitor 81, further, openings 83 and 84 are provided in a spring portion 47a which is integrally provided with a stator terminal 45a, to allow passage of the tool in the through holes 82 and 55 and rotation thereof.

Capacitance of the variable capacitor 81 can be adjusted from either vertical side, similarly to the variable capacitor 61 shown in FIGS. 5 to 7.

While the through-hole 71 provided in the stator 62 of the variable capacitor 61 shown in FIGS. 5 to 7, and the through-hole 82 provided in the stator 43a of the variable capacitor 81 shown in FIG. 13 typically have circular sections, these sectional shapes may be replaced by other shapes so long as the same allow passage and rotation of the tools.

Although the present invention has been described and illustrated in detail, it is clearly understood that the same is by way of illustration and example only and is not to be taken by way of limitation, the scope of the present invention being limited only by the terms of the appended claims.

What is claimed is:

1. A variable capacitor comprising:

a rotor having a rotor electrode and a first through-hole for receiving a tool for rotating said rotor;

a stator having a stator electrode opposed to said rotor electrode, and said stator having a second through-hole, said second through-hole being aligned with said first through-hole and having dimensions allowing passage and rotation within said second through-hole of the tool being received by said first through-hole for rotating said rotor;

a dielectric material interposed between said stator electrode and said rotor electrode; and means for holding said rotor rotatably with respect to said stator.

2. A variable capacitor in accordance with claim 1, wherein;

said stator comprises a dielectric member having an interior;

said stator electrode is disposed in the interior of said dielectric member of said stator; and said dielectric material interposed between said stator electrode and said rotor electrode comprises a part of said dielectric member of said stator.

3. A variable capacitor in accordance with claim 1, wherein said rotor is made of a metal, said rotor electrode being provided by a projecting portion formed on one surface of said rotor.

4. A variable capacitor in accordance with claim 1, wherein;

said stator comprises an electric insulator member having a surface; and said stator electrode is disposed on the surface of said electric insulator member.

5. A variable capacitor in accordance with claim 1, wherein;

said rotor comprises a dielectric member having an interior;

said rotor electrode is disposed in the interior of said dielectric member of said rotor; and said dielectric material interposed between said stator electrode and said rotor electrode comprises a part of said dielectric member of said rotor.

6. A variable capacitor in accordance with claim 1, wherein said means for holding said rotor comprises a cover engaging said stator while holding said rotor on said stator, said cover having an opening allowing receipt of the tool in said rotor through-hole.

7. A variable capacitor in accordance with claim 6, further comprising a spring washer disposed between said rotor and said cover for urging said rotor against said stator.

* * * * *